United States Patent [19]

Grzybowski et al.

[11] Patent Number: 4,743,836
[45] Date of Patent: May 10, 1988

[54] CAPACITIVE CIRCUIT FOR MEASURING A PARAMETER HAVING A LINEAR OUTPUT VOLTAGE

[75] Inventors: Richard R. Grzybowski, Meriden; Paul N. Marshall, Avon, both of Conn.

[73] Assignee: United Technologies Corporation, Hartford, Conn.

[21] Appl. No.: 805,685

[22] Filed: Dec. 6, 1985

[51] Int. Cl.$^4$ .................. G01R 27/26; G01R 11/52
[52] U.S. Cl. .................. 324/60 CD; 361/280; 73/780; 324/61 R
[58] Field of Search ............. 324/60 R, 60 C, 60 CD, 324/61 R, 61 P; 361/280–286; 73/718, 724, 774, 780

[56] References Cited

U.S. PATENT DOCUMENTS

| | | | |
|---|---|---|---|
| 3,774,237 | 11/1973 | Hardway, Jr. .................. | 324/61 R |
| 3,903,478 | 9/1975 | Stuart et al. .................. | 324/61 R |
| 4,006,411 | 2/1977 | Akagawa et al. .................. | 324/61 R |
| 4,032,841 | 6/1977 | Knippelmier .................. | 324/60 CD |
| 4,033,332 | 7/1977 | Hardway, Jr. et al. ......... | 324/61 R X |
| 4,040,041 | 8/1977 | Fletcher et al. ............. | 324/60 CD X |
| 4,149,231 | 4/1979 | Bukosky et al. ........... | 324/60 CD X |
| 4,295,685 | 10/1981 | Ponkala .................. | 324/60 |
| 4,322,678 | 3/1982 | Capots et al. .................. | 324/61 R |
| 4,339,750 | 7/1982 | Delacruz .................. | 324/60 CD X |
| 4,399,404 | 8/1983 | Resh .................. | 324/61 R |
| 4,405,970 | 9/1983 | Swindal et al. .................. | 361/283 |
| 4,415,948 | 11/1983 | Grantham et al. .................. | 361/283 |
| 4,431,962 | 2/1984 | Kompelien .................. | 324/61 R X |
| 4,434,664 | 3/1984 | Antonazzi .................. | 73/701 |
| 4,449,409 | 5/1984 | Antonazzi .................. | 361/283 X |
| 4,481,465 | 11/1984 | Fredericks et al. ........... | 324/60 CD |

*Primary Examiner*—Reinhard J. Eisenzopf
*Assistant Examiner*—Warren S. Edmonds
*Attorney, Agent, or Firm*—J. Kevin Grogan; Francis J. Maguire, Jr.

[57] ABSTRACT

A capacitance pressure measuring circuit includes a pressure sensitive capacitive transducer and a reference capacitor that are configured in a differential mode to alternately charge and discharge in response to square wave signals. An integrator receives signals from the capacitors and outputs two voltage levels. These voltage levels are provided to a synchronous clock driven selectable sample and hold stage and then to a differential amplifier. The amplifier provides a linear voltage signal proportional to the change in the difference in capacitance of the transducer divided by the capacitance of the integrator.

6 Claims, 5 Drawing Sheets

CAPACITIVE CIRCUIT FOR MEASURING A PARAMETER HAVING A LINEAR OUTPUT VOLTAGE

DESCRIPTION

1. Technical Field

This invention relates to electrical circuits used to measure capacitance changes and more particularly to those circuits which measure external parameter such as pressure by converting a capacitance change into a linear output voltage.

2. Background Art

Electrical circuits which measure capacitance changes as a function of applied pressure on capacitance transducers are well known in the art. The known transducers include silicon "pill" type miniature silicon capacitance pressure transducers. These transducers typically comprise a pair of silicon pieces joined together with borosilicate glass by a field assisted bonding process, forming an evacuated capsule with opposing conductive surfaces. The opposing silicon pieces form the plates of a pressure variable capacitor. Examples of miniature silicon capacitive pressure transducers are found in the commonly owned U.S. Pat. Nos. 4,415,948 and 4,405,970 of J. Swindal and D. Grantham.

The electrical circuits used in conjunction therewith typically convert small changes in capacitance to a change in frequency of a signal output therefrom. The prior art contains U.S. Pat. No. 4,434,664 of Antonazzi. Disclosed therein is a complicated pressure ratio measuring system comprising a pair of quartz capacitive pressure transducers receiving an alternating excitation signal. A feedback apparatus sums and digitizes the output signals therefrom. Digitized feedback signals recursively subtract or add a known step from the signal until a signal null relative to a reference signal value has been established. The digital number representing the number of steps necessary to achieve a null is indicative of the pressure sensed by the capacitors.

Additionally the prior art contains an electronic sensor switch of Ponkala, U.S. Pat. No. 4,295,090. The characteristic feature disclosed therein is a switching apparatus which utilizes a circuit of CMOS inverters or the like as an oscillator. The transducer capacitors are selectively switched into the oscillator circuit via a multiplexing scheme and, when selected, become an integral part of the oscillator's RC timing network. The device principally charges and discharges capacitors, the rate of which is proportional to the transducer capacitance. This device requires operation at high frequency and is sensitive to stray capacitance.

Capacitance measuring circuits of the prior art are both sensitive to stray capacitance and to the switching speed of the device. Moreover, the high part count associated with prior art circuits is incompatible with applications which require fabrication on a single substrate.

DISCLOSURE OF INVENTION

An object of the present invention is to provide an improved electrical circuit for use with silicon-glass-silicon capacative transducers in measuring an external applied pressure.

According to the present invention, a capacitive pressure measuring circuit includes timing circuitry providing first, second and third selectable clock signals as well as for providing square wave signals. A capacitive integrating circuit receives both the square wave signals and the first clock signal as well as a reference signal, and provides for alternative charging and discharging of a reference capacitor and a capacitor responsive to an applied external pressure. The integrating capacitor circuit also includes a signal integrator that has a feedback circuit which integrates the signals output from the capacitors. The integrator also provides charge dumping of the feedback circuit in response to the first clock signal. A sampling circuit which comprises first and second sample and hold stages alternatively samples the signals from the integrator in response to the second and third clock signals respectively. Also included is a differential amplifier which receives the reference signal and the first and second sampled signals. The amplifier provides a linear voltage signal proportional to the change in capacitance of the pressure responsive capacitor from the difference between the first and second sampled signals.

BEST MODE FOR CARRYING OUT THE INVENTION

Figures 1, 5:
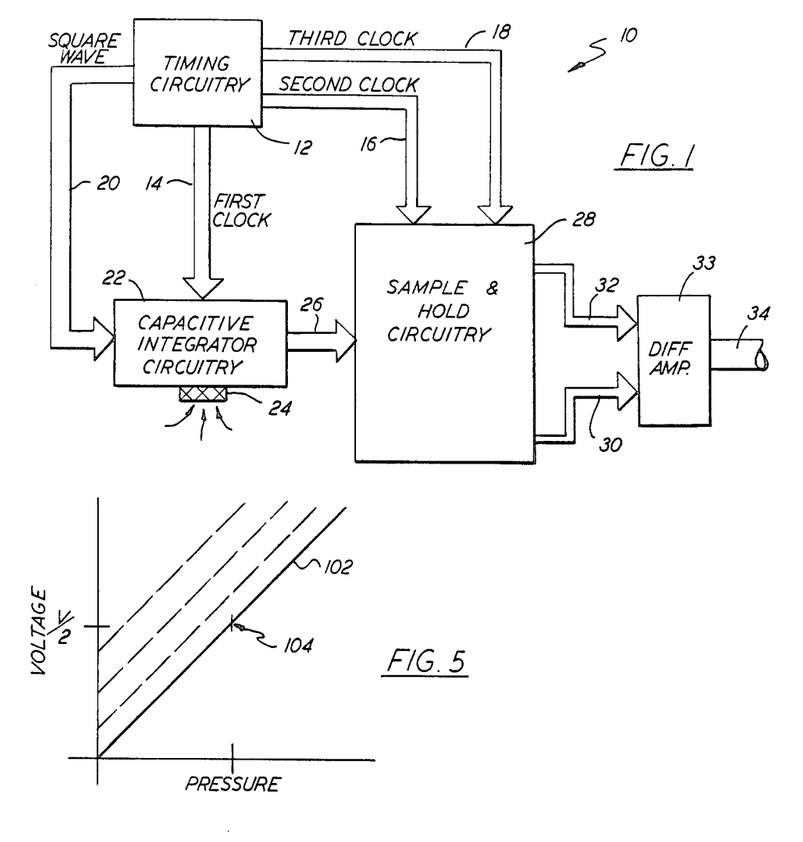
FIG. 1 is a simplified block diagram of a capacitance pressure measuring circuit having a linear output voltage signal provided according to the present invention.
FIG. 5 is a diagram illustrating the relationship between voltage and pressure in the electrical circuit of FIG. 4.

In a simplified block diagram of a capacitance pressure measuring circuit provided according to the present invention, a capacitance pressure measuring circuit 10 includes timing circuitry 12 that is of a conventional type and is configured to provide first, second and third clock signals on lines 14, 16 and 18, respectively. In addition the timing circuitry provides square wave signals on lines 20. A capacitive integrator circuit 22 includes a reference capacitor and a pressure sensitive capacitor 24 and is configured such that the square wave signals alternatively charge and discharge the capacitors. The signals therefrom are integrated and provided on lines 26. Additionally, the capacitive integrator provides for charge dumping circuitry that is responsive to the first clock signal.

Sample and hold circuitry 28 receives the integrated signals in first and second sampling stages. As detailed hereinafter with respect to FIG. 3, the sampling of the integrator signals is controlled by second and third clock signals. The sampled signals are provided on lines 30 and 32 to a differential amplifier 33. Signals from the differential amplifier are provided on lines 34 and correspond linearly to the difference of charge stored in the reference capacitor and the capacitive pressure transducer, divided by the feedback capacitance of the integrator. This is a point of departure of the present invention from the prior art. A capacitance pressure measuring circuit provided according to the present invention measures a capacitance difference that is directly proportional to the change in capacitance ($\Delta C$) rather than the inverse of the capacitance change ($1/\Delta C$) as is done in the prior art. Consequently, a capacitance pressure measuring circuit provided according to the present invention is much less sensitive to stray capacitance.

Figure 2:
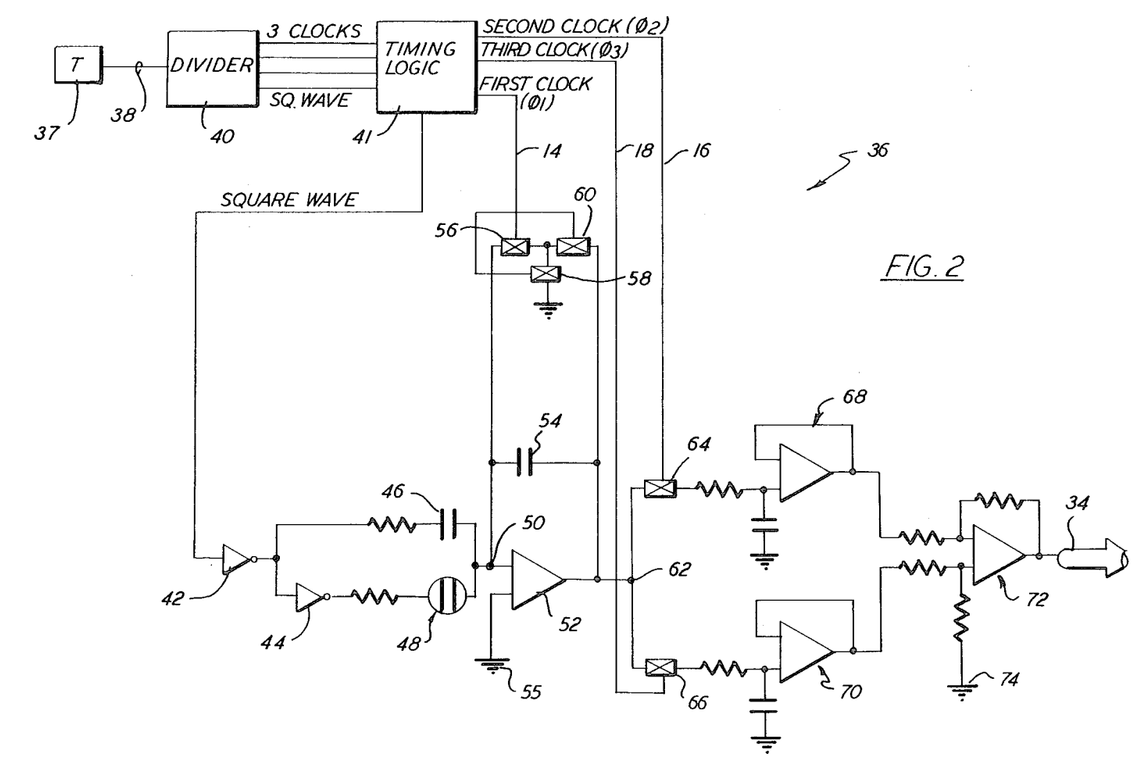
FIG. 2 is a detailed block diagram of the circuit of FIG. 1.

FIG. 2 is a detailed schematic 36 of the capacitance pressure measuring circuit of FIG. 1. Included is a conventional timer 37 such as a generic 555 timer which provides in the best mode embodiment an audio frequency signal on lines 38. In the best mode embodiment the frequency is approximately 3200 Hz. A divider circuit 40 is used to divide the frequency to provide the three clock signals and the square wave signal. In the best mode embodiment the divider circuit comprises a chain of conventional CMOS JK flip flops which are cascaded such that the incoming 3200 Hz signal is divided into 1600, 800, 400 Hz signals and a 200 Hz square wave signal.

The three clock signals are received by conventional timing logic circuitry 41 which is typically comprised of CMOS Boolean logic NAND gates and inverters. As detailed hereinafter with respect to FIG. 3, the clock and input signals are given a timing relationship enabling a capacitance pressure measuring circuit provided according to the present invention to be insensitive to changes in the frequency.

The square wave signal on line 20 is received by a pair of capacitors configured in parallel. Conventional inverters 42 and 44 provide any necessary signal conditioning. Capacitor 46 acts as a reference and in the best mode embodiment comprises an NPO dielectric capacitor or equivalent capacitors that are stable with temperature change. Capacitor 48 is a pressure sensitive capacitor such as a silicon-glass-silicon pill type capacitor. Although a pressure transducer is shown in the best mode embodiment, those skilled in the art will recognize that other capacitance transducers may be equivalently substituted.

The square wave signal input to the capacitors as configured produces an alternative charging and discharging of the capacitors. The movement of charge produces a voltage that is present at summing junction 50. Amplifer 52 is configured as an integrator with capacitor 54 that also comprises an NPO type capacitor and which provides feedback thereto. Those skilled in the art will note that the charge measuring nature of the circuit requires operational amplifiers with very high input impedances be used throughout the capacitance measuring circuit. An example is a G.E. (CMOS) operational amplifier No. ICL7612 which has an input impedance of $10^{12}$ ohms. The noninverting input of the amplifier 55 is provided with a reference potential which in the best mode embodiment is selected to be the midpoint of the desired voltage swing of the circuit (V/2).

For other applications the circuit may be configured to have different reference potential. For example, the reference potential is selected to be the lowest value of voltage when used with a capacitance humidity transducer, such as a Vaisala humidcap.

The output voltage of the integrator ($V_O$) will have the same frequency as the input square wave. The square wave first half-cycle positive voltage ($V+$) results in a charge distribution:

$$Q = (V - V_{sj} + V/2)C_{pt} = (V_{sj} + V/2)C_r \quad (1)$$

where Q is the total charge, V is the square wave potential, $V_{sj}$ corresponds to the potential at the summing junction, $C_{pt}$ corresponds to the capacitance of the pressure transducer, and $C_r$ corresponds to that of the reference transducer. Rearranging terms, the voltage at the summing junction can be expressed as $$V \frac{\left(\frac{3}{2}C_{pt} - \frac{C_r}{2}\right)}{C_r - C_{pt}} = V_{sj} \quad (2)$$

If the voltage at the summing junction is less than the midpoint voltage (V) charge will move out from the pressure transducer by an amount equal to $(V/2 - V_{sj})C_p$. Correspondingly, the charge moving into the reference transducer is $(V_{sj} - V/2)C_r$.

The net charge movement can be described as $$(V/2 - V_{sj})C_{pt} - (V_{sj} - V/2)C_r = (V_o - V/2)C_f \quad (3)$$

where $C_f$ corresponds to the capacitance of feedback capacitor 54.

$$V/2(C_{pt} - C_r) - V_{sj}(C_{pt} + C_r) = (V_o - V/2)C_f \quad (4)$$

Substituting (2) into (4), the output voltage for the positive portion of the input square wave corresponds to $$V+ = \frac{V}{2} + \frac{V(C_r - C_{pt})}{C_f} \quad (5)$$

A similar analysis can be made for the negative going portion of the input square wave. The output voltage for the second half-cycle of the square wave is expressed as $$V- = \frac{V}{2} + \frac{V(C_r - C_{pt})}{C_f} \quad (6)$$

where V, $C_r$, $C_{pt}$ and $C_f$ are as indicated above. The difference between the two output voltages is obtained by subtracting (6) and (5) and may be expressed as $$V+ - V- = \frac{2V(C_r - C_{pt})}{C_f} \quad (7)$$

A transmission gating network comprised typically of analog CMOS switches could be 56, 58, and 60 is responsive to the first clock signal received on lines 14. The network dumps any accumulated charge in the feedback capacitor, ensuring that there will be no charge build-up in the feedback capacitor by resetting the voltage across the feedback capacitor to the reference voltage (V/2) at every half-cycle of the square wave.

The output of the integrator is received at node 62 and is provided to a conventional sample and hold circuit (28, FIG. 1). Transmission gates 64 and 66, responsive to clock signals two and three, respectively, allow only selective sampling of the capacitive integrator signal when the respective half-cycle data is present.

First and second signal sampling states 68 and 70 hold the high and low voltage signal levels respectively.

The signals output therefrom are presented to differential amplifier 72 which provides on lines 34 a signal whose voltage is proportional to the difference in charge stored in the reference capacitor 46 and the pressure sensitive capacitor 48 divided by the capacitance of the capacitor 54 in the integrator. The voltage provided at the noninverting input 74 of the differential amplifier is selected such that the output signals will swing about that voltage magnitude. In the best mode embodiment this voltage is selected to be one-half of the square wave signal amplitude. However, those skilled in the art will recognize that other levels can be equivalently substituted.

Figure 3:
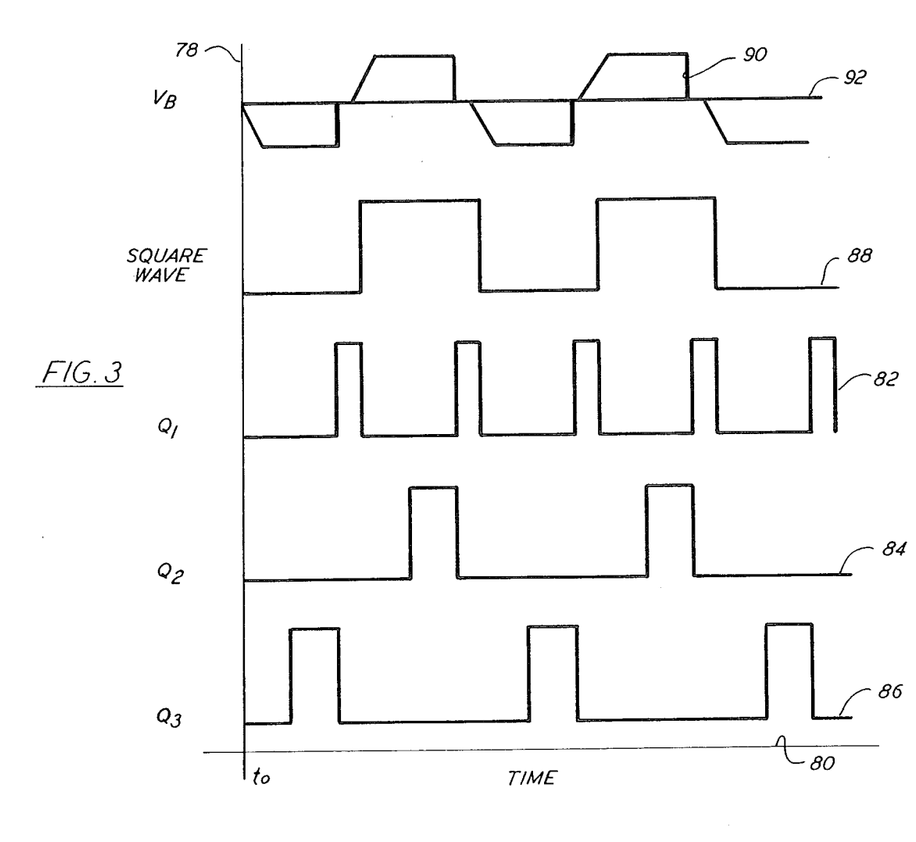
FIG. 3 is a timing diagram illustrating the relationship between signal waveforms found in the circuit of FIG. 1.

FIG. 3 is an illustration of the relative timing between signals found in the capacitance pressure measuring circuit of FIG. 1. Axes 78 and 80 correspond to voltage and time respectively. Curves 82, 84 and 86 correspond to first, second and third clock signals repectively and curve 88 corresponds to the square wave input signal. Curve 90 corresponds to the voltage received by the sample and hold circuitry at node 62, while line 92 represents the reference voltage (V/2).

As indicated hereinabove the timing logic circuitry (41, FIG. 2) is preset to establish the time relationships between the input square wave and the clock signals. The clock signals two ($\phi_2$) and three ($\phi_3$) are selected such that each enables the respective sampling circuitry to receive only a single level signal. The second clock signal is adjusted such that only a high signal will be presented to the first sampling circuitry 68, and the third clock signal ensures that only a low voltage will be presented to the second sampling circuitry 70. Excess charge is removed from the feedback capacitor (54, FIG. 2) by selecting the first clock signal ($\phi_1$) to enable the charge dumping circuitry between the positive and negative half-cycles.

Figure 4:
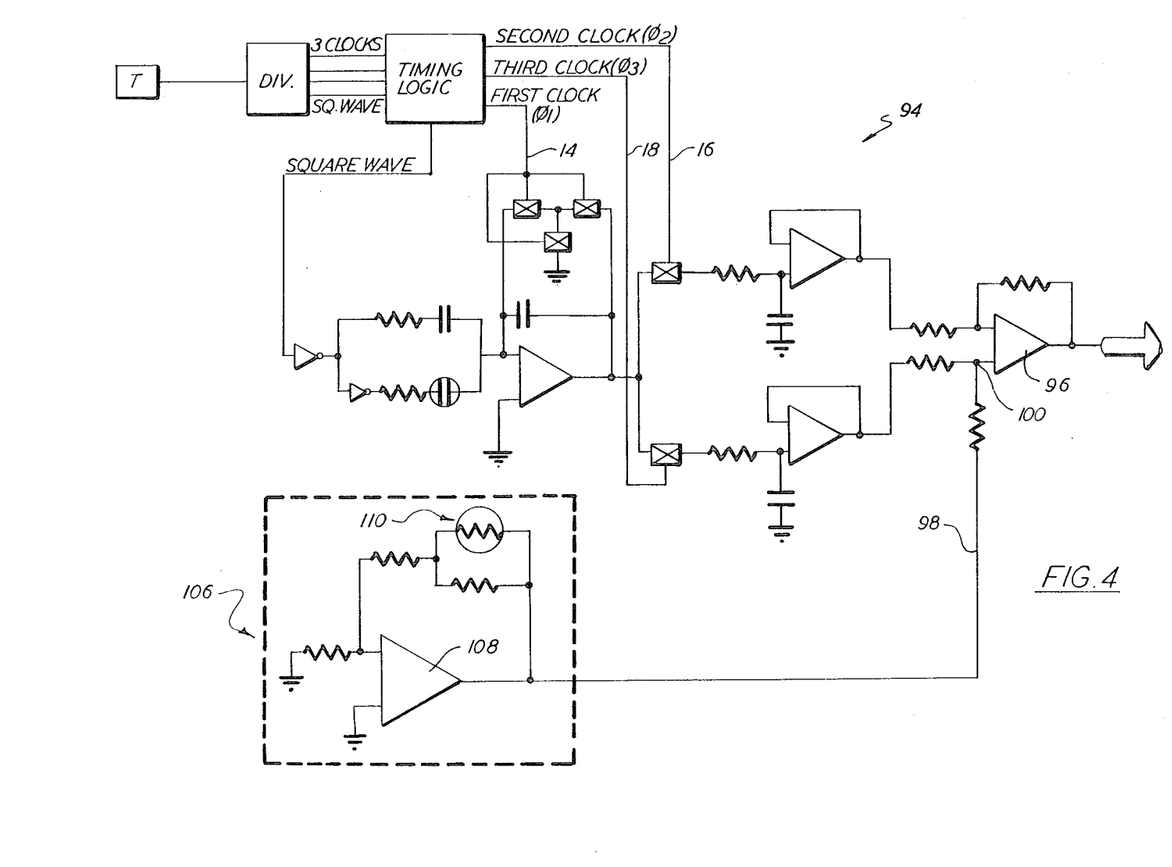
FIG. 4 is a detailed block diagram of an alternative embodiment of the circuit of FIG. 2 with thermal compensation circuitry.

FIG. 4 is a detailed block diagram of an alternative embodiment 94 of the circuitry of FIG. 1 with thermal compensation circuitry.

As similarly indicated hereinabove with reference to FIG. 2, a signal output on a line 95 from a difference amplifier swings about a bias point voltage provided on lines 98 to a noninverting amplifier input 100. As the environment surrounding the circuit changes temperature, the voltage swing of the output signals will shift due to a thermally induced change in the bias point voltage present on lines 98.

FIG. 5 is a diagram indicating the effect of temperature changes on an uncompensated capacitance pressure measuring circuit. Solid line 102 corresponds to the voltage versus pressure relationship at an initial temperature. Point 104 corresponds to the reference voltage selected for the particular application. As the temperature increases, the curve is offset (dashed lines 105), degrading the performance of the circuit.

Referring again to FIG. 4, there is seen a thermal compensation circuit 106 comprising amplifier 108 and thermistor 110 configured so as to maintain a constant voltage at the noninverting input of amplifier 96. The thermistor is conventional, such as a Dale IW2002-5. As a result the voltage versus pressure relationship (line 102, FIG. 5) is unchanged with temperature. In all other aspects the thermally compensated alternative embodiment of FIG. 4 is identical with the capacitance pressure measuring circuit of FIG. 2.

Figure 6:
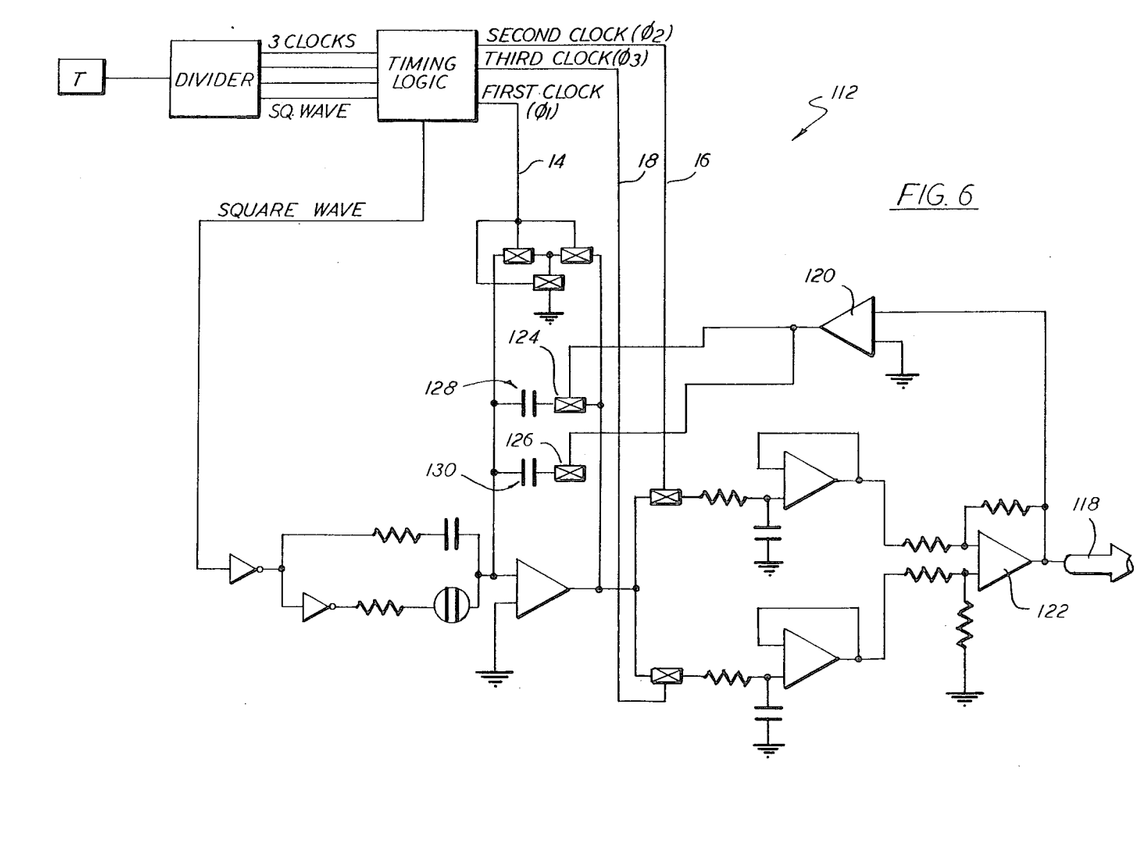
FIG. 6 is a detailed block diagram of an alternative embodiment of the circuit of FIG. 2 that includes circuitry providing piecewise linear output signals.
Figure 7:
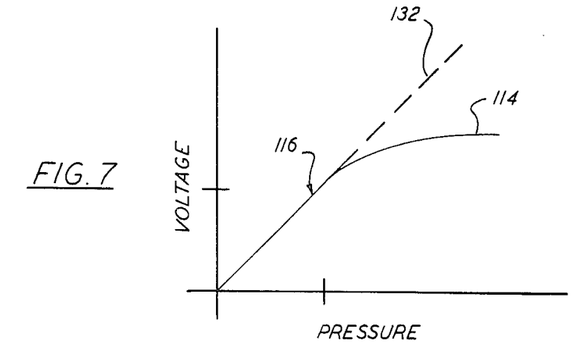
FIG. 7 is an illustration of the relationship between voltage and pressure found in the electrical circuit of FIG. 6.

FIG. 6 is a drawing of another alternative embodiment 112 of the capacitance pressure measuring circuit of FIG. 2 which allows for piecewise linear output voltage signals. It is well known in the art that the voltage and pressure relationship of many capacitive transducers becomes nonlinear and as a result the utility of circuits with such transducers is limited as the voltage swing and offset voltage of the output signals must be adjusted to a less than optimized range. FIG. 7 illustrates a voltage-pressure relationship for a circuit having a nonlinear capacitance pressure transducer. Curve 114 corresponds to the output signal from the circuit and point 116 corresponds to the desired midpoint voltage. From inspection it can be seen that the bias voltage and dynamic range of the circuit must be limited to ensure linearity.

Referring again to FIG. 6, piecewise linearity of the output signal on line 118 is accomplished by capacitance selector circuitry which comprises CMOS operational amplifier 120 which receives a signal output from CMOS differential amplifier 122 and is configured in a conventional comparator form. The output of the amplifier is provided to conventional CMOS transmission gates 124 and 126 which select a feedback capacitor 128 or 130 in the integrator stage of the circuit. With the output voltage present on lines 118 below a threshold magnitude, only capacitor 128 is selected. However, when this voltage magnitude exceeds the threshold adjustably selected, the comparator enables capacitor 130 via the corresponding CMOS switch and disables capacitor 128 via gate 124.

As a result, the output voltage of the circuit maintains linearity. Dashed line 132 of FIG. 7 illustrates an output voltage from the alternative embodiment of FIG. 6. In all other aspects the alternative capacitance pressure measuring circuit of FIG. 6 is identical with the capacitance pressure measuring circuit of FIG. 2.

Similarly, although the invention has been shown and described with respect to a best mode embodiment thereof, it should be understood by those skilled in the art that various other changes, omissions, and additions thereto may be made therein without departing from the spirit and scope of the invention.

We claim:

1. A capacitive electrical circuit for measuring a parameter, comprising:

timing circuitry for providing first, second and third clock signals, and for providing a periodic square wave signal;

a capacitive integrating circuit having an integrator, discharge circuitry, a reference capacitor and a sensing capacitor responsive to the external parameter, one of said capacitors responsive to said square wave signal and the other to its inverse, said square wave signal providing alternative charging and discharging of said reference capacitor and said sensing capacitor, said reference and sensing capacitors providing a charge difference signal indicative of the difference in magnitude of the charge stored therein, said integrator responsive to a reference signal and to said charge difference signal for integrating said charge difference signal and providing an integrated output signal indicative of the magnitude of said charge difference, said discharge circuitry discharging said integrator each half cycle of said square wave signal in response to said first clock signal;

sampling circuit means including first and second sampling means for alternatively sampling, in alternate half cycles of said square wave signal, said integrated output signal from said capacitive integrating circuit in response to said second and third clock signals, respectively, and providing first and second sampled signals; and a differential amplifier, responsive to said reference signal, and responsive to said first and second sampled signals, for providing from the difference in magnitudes therebetween, a linear signal having a magnitude proportional to the magnitude of the capacitance of said parameter responsive sensing capacitor.

2. The capacitive electrical circuit of claim 1, wherein said parameter sensitive capacitor means comprises a silicon-glass-silicon capacitive pressure transducer.

3. The capacitive electrical circuit of claim 1, wherein said capacitive electrical circuit further comprises compensation means responsive to temperature for adjusting the magnitude of said reference signal provided to said differential amplifier in response to a change in temperature of the measuring circuit.

4. The capacitive electrical circuit of claim 1, wherein said differential amplifier means includes selector means for comparing signals output therefrom with said reference signal and adjusting said feedback circuitry means in dependence thereon.

5. The capacitive electrical circuit of claim 1, wherein said parameter sensitive capacitor means comprises a capacitive humidity transducer.

6. Apparatus, comprising:
a reference capacitor and a sensing capacitor having a common output node, each having a separate input node, one responsive to a square wave input signal and the other to its inverse, said capacitors alternately providing at said common output node a stored charge signal having a magnitude indicative of the quantity of charge stored therein;

an integrator, responsive to each of said stored charge signals for alternately integrating said stored charge signals during each half cycle of said square wave signal for providing an integrated output signal alternately having a magnitude indicative of the charge stored on each of said capacitors;

discharge means, responsive to a first periodic timing signal at a frequency in synchronism with but at twice that of said square wave for discharging said integrator at the end of each half cycle of said square wave signal;

dual sampling means, having a first half sampling circuit responsive to a second periodic timing signal and a second half sampling circuit responsive to a third periodic timing signal, said second and third timing signals at a frequency in synchronism with and equal to that of said square wave signal but shifted in time with respect to one another by one half cycle, said first half sampling circuit responsive to said second periodic timing signal and to said integrated output signal during each first half cycle of said square wave for storing a first signal having a magnitude indicative of the magnitude of said integrated signal (indicative of the charge stored in one of said capacitors) and said a second half sampling circuit responsive to said third periodic timing signal and to said integrated output signal during each second half cycle of said square wave for storing a second signal having a magnitude indicative of the magnitude of said integrated signal (indicative of the charge stored in the other of said capacitors); and differential amplifier means, responsive to said first and second stored signals for providing a difference signal having a magnitude indicative of the difference in magnitudes between said first and second stored signals.

* * * * *

UNITED STATES PATENT AND TRADEMARK OFFICE
CERTIFICATE OF CORRECTION

PATENT NO. : 4,743,836

DATED : 5/10/88

INVENTOR(S) : Richard G. Grzybowski et al

It is certified that error appears in the above-identified patent and that said Letters Patent is hereby corrected as shown below:

Column 4, equation (1). Cancel "$Q=(V-V_{sj}+V/2)C_{pt}=(V_{sj}+V/2)C_r$"

and substitute

-- $Q = (V-V_{sj} + V/2)C_{pt} = (V_{sj} + V/2)C_r$ --

Column 4, equation (6) Cancel "$V^- = \dfrac{V}{2} + \dfrac{V(C_r - C_{pt})}{C_f}$"

and substitute

-- $V^- = \dfrac{V}{2} - \dfrac{V(C_r - C_{pt})}{C_f}$ --

Signed and Sealed this

Twenty-eighth Day of February, 1989

*Attest:*

DONALD J. QUIGG

*Attesting Officer*  *Commissioner of Patents and Trademarks*